United States Patent
Shepard et al.

(10) Patent No.: US 9,205,927 B2
(45) Date of Patent: Dec. 8, 2015

(54) AIRCRAFT ENVIRONMENTAL CONTROL SYSTEM INLET FLOW CONTROL

(71) Applicant: HONEYWELL INTERNATIONAL INC., Morristown, NJ (US)

(72) Inventors: Eric Shepard, Phoenix, AZ (US); Todd Wolownik, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 414 days.

(21) Appl. No.: 13/859,978

(22) Filed: Apr. 10, 2013

(65) Prior Publication Data
US 2014/0305130 A1    Oct. 16, 2014

(51) Int. Cl.
| | |
|---|---|
| *B64D 41/00* | (2006.01) |
| *F02C 9/18* | (2006.01) |
| *F02C 6/08* | (2006.01) |
| *F02C 7/141* | (2006.01) |
| *F02C 7/32* | (2006.01) |
| *B64D 13/06* | (2006.01) |

(52) U.S. Cl.
CPC ............... *B64D 41/00* (2013.01); *B64D 13/06* (2013.01); *F02C 6/08* (2013.01); *F02C 7/141* (2013.01); *F02C 7/32* (2013.01); *F02C 9/18* (2013.01); *B64D 2013/0611* (2013.01); *B64D 2013/0618* (2013.01); *B64D 2013/0648* (2013.01); *F05D 2270/313* (2013.01); *Y02T 50/56* (2013.01)

(58) Field of Classification Search
CPC ............... B64D 2013/0611; B64D 2013/0618; B64D 2013/0648; B64D 2013/0696; B64D 41/00; F02C 3/13; F02C 6/04; F02C 6/06; F02C 6/08; F02C 7/14; F02C 7/141; F02C 7/18; F02C 7/185; F02C 7/32; F02C 9/18; F05D 2270/303; F05D 2270/313
See application file for complete search history.

(56) References Cited

U.S. PATENT DOCUMENTS

| | | | |
|---|---|---|---|
| 4,627,234 A | 12/1986 | Schuh | |
| 5,067,099 A | 11/1991 | McCown et al. | |
| 5,160,069 A | 11/1992 | Klaass et al. | |
| 5,161,363 A | 11/1992 | Klaass et al. | |
| 5,235,801 A | 8/1993 | Evenson et al. | |
| 5,274,996 A | 1/1994 | Goff et al. | |
| 6,189,324 B1 | 2/2001 | Williams et al. | |
| 6,283,410 B1* | 9/2001 | Thompson | 244/59 |
| 7,168,254 B2 | 1/2007 | Riley | |
| 2008/0057848 A1 | 3/2008 | Gray et al. | |

FOREIGN PATENT DOCUMENTS

EP    1283166 A2    2/2003

OTHER PUBLICATIONS

EP Search Report for Application No. EP 14161859.5 dated Jul. 7, 2014.
EP Communication for Application No. EP 14 161 859.5-1754 dated Apr. 15, 2015.

* cited by examiner

Primary Examiner — Phutthiwat Wongwian
Assistant Examiner — Marc Amar
(74) Attorney, Agent, or Firm — Ingrassia Fisher & Lorenz, P.C.

(57) ABSTRACT

A system and method for controlling bleed air flow into an air cycle machine that includes a bleed air inlet and a conditioned air outlet is provided. The system and method include discharging bleed air from an operating gas turbine engine, sensing exhaust gas temperature (EGT) of the gas turbine engine, sensing conditioned air temperature at the conditioned air outlet, and controlling bleed air flow into the air cycle machine based on the sensed EGT and on the sensed conditioned air temperature.

13 Claims, 2 Drawing Sheets

AIRCRAFT ENVIRONMENTAL CONTROL SYSTEM INLET FLOW CONTROL

TECHNICAL FIELD

The present invention generally relates to aircraft environmental controls, and more particularly relates to an aircraft environmental control system (ECS) inlet flow control system and method that more closely matches ECS demand with bleed air supply flow capacity.

BACKGROUND

In many aircraft, main propulsion engines not only provide propulsion for the aircraft, but may also be used to drive various other rotating components such as, for example, generators, compressors, and pumps, to thereby supply electrical and/or pneumatic power. However, when an aircraft is on the ground, its main engines may not be operating. Moreover, in some instances the main propulsion engines may not be capable of supplying the power needed for propulsion as well as the power to drive these other rotating components. Thus, many aircraft include an auxiliary power unit (APU) to supplement the main propulsion engines in providing electrical power to electrical loads and/or bleed air to pneumatic loads. An APU may also be used to start the propulsion engines.

An APU is typically a gas turbine engine that includes a combustion section, a power turbine section, and a compressor section. During operation of the APU, the compressor section draws in and compresses ambient air and supplies the air to the combustion section. Fuel is injected into the compressed air within the combustion section to produce the high-energy combusted air to the power turbine section. The power turbine section rotates to drive a generator for supplying electrical power, via a main shaft, and to drive its own compressor section and/or an external load compressor.

When needed, compressed air may be bled from the compressor in the APU via a bleed air port and a load control valve. The load control valve may be configured as either a modulating-type valve or an open/closed-type valve. When a modulating-type valve is used, the load control valve is used to, among other things, limit the pneumatic load on the APU. The load control valve is typically controlled via an electronic control unit that implements closed-loop feedback control based on APU exhaust gas temperature (EGT). When an open/closed-type valve is used, the APU typically relies on downstream devices to limit the pneumatic load. If the flow capacity of the downstream device has a larger capacity than the APU, there is risk of over temperature on the APU. The APU will close the load control valve in the event of an over temperature resulting in loss of bleed air to the aircraft.

One of the main pneumatic loads for an APU is the aircraft environmental control system (ECS). As is generally known, an aircraft ECS is either sized such that it will not exceed APU flow capacity (as indicated by its exhaust gas temperature) or has a means to self-regulate its flow capacity so as to not exceed APU flow capacity. Typically, an ECS system is configured to regulate its input flow utilizing an inlet flow control valve that is controlled independently of the APU. For example, the inlet flow control valve may be controlled based on measured airflow into the ECS. Such flow regulating methodologies typically require relatively large margins to account for airflow measurement tolerances, and on the APU's power capability to ensure that ECS flow demand does not exceed APU flow capacity. These relatively large margins limit the actual power utilization capability of the APU.

Hence, there is a need for a system and method for controlling bleed air inlet flow into an aircraft ECS system that does not rely on relatively large margins, so that ECS demand and APU capacity can be more closely matched. The present invention addresses at least this need.

BRIEF SUMMARY

In one embodiment, an aircraft environmental control system includes an air cycle machine, an inlet flow control valve, an exhaust gas temperature (EGT) sensor, a conditioned air temperature, and a controller. The air cycle machine has a bleed air inlet and a conditioned air outlet. The air cycle machine is adapted to selectively receive a flow of bleed air at the bleed air inlet and is configured, upon receipt thereof, to discharge conditioned air from the conditioned air outlet. The conditioned air has a temperature lower than the bleed air. The inlet flow control valve is coupled to the bleed air inlet and is adapted to receive bleed air discharged from a gas turbine engine. The inlet flow control valve is coupled to receive valve commands and is configured, in response to the valve commands, to move between a closed position and a plurality of open positions. The EGT sensor is configured to sense EGT of the gas turbine engine and supply an EGT signal representative thereof. The conditioned air temperature sensor is configured to sense the temperature of the conditioned air and supply a conditioned air temperature signal representative thereof. The controller is coupled to receive the EGT signal and the conditioned air temperature signal and is configured, in response thereto, to supply valve commands to the inlet flow control valve to thereby control the flow of bleed air into the bleed air inlet.

In another embodiment, an aircraft environmental control system includes an auxiliary power unit (APU), an air cycle machine, an inlet flow control valve, an EGT sensor, a conditioned air temperature, and a controller. The APU has a bleed air outlet, and is configured to selectively discharge bleed air from the bleed air outlet. The air cycle machine has a bleed air inlet and a conditioned air outlet. The bleed air inlet is coupled to selectively receive the bleed air discharged from the APU. The air cycle machine is configured, upon receipt of the bleed air, to discharge conditioned air from the conditioned air outlet. The conditioned air has a temperature lower than the bleed air. The inlet flow control valve is coupled between the bleed air outlet and the bleed air inlet to receive the bleed air discharged from the APU. The inlet flow control valve is coupled to receive valve commands and is configured, in response to the valve commands, to move between a closed position and a plurality of open positions. The EGT sensor is configured to sense EGT of the APU and supply an EGT signal representative thereof. The conditioned air temperature sensor is configured to sense the temperature of the conditioned air and supply a conditioned air temperature signal representative thereof. The controller is coupled to receive the EGT signal and the conditioned air temperature signal and is configured, in response thereto, to supply valve commands to the inlet flow control valve to thereby control the flow of bleed air into the bleed air inlet.

In yet another embodiment, a method of controlling bleed air flow into an air cycle machine that includes a bleed air inlet and a conditioned air outlet includes the steps of discharging bleed air from an operating gas turbine engine, sensing exhaust gas temperature (EGT) of the gas turbine engine, sensing conditioned air temperature at the conditioned air outlet, and controlling bleed air flow into the air cycle machine based on the sensed EGT and on the sensed conditioned air temperature.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
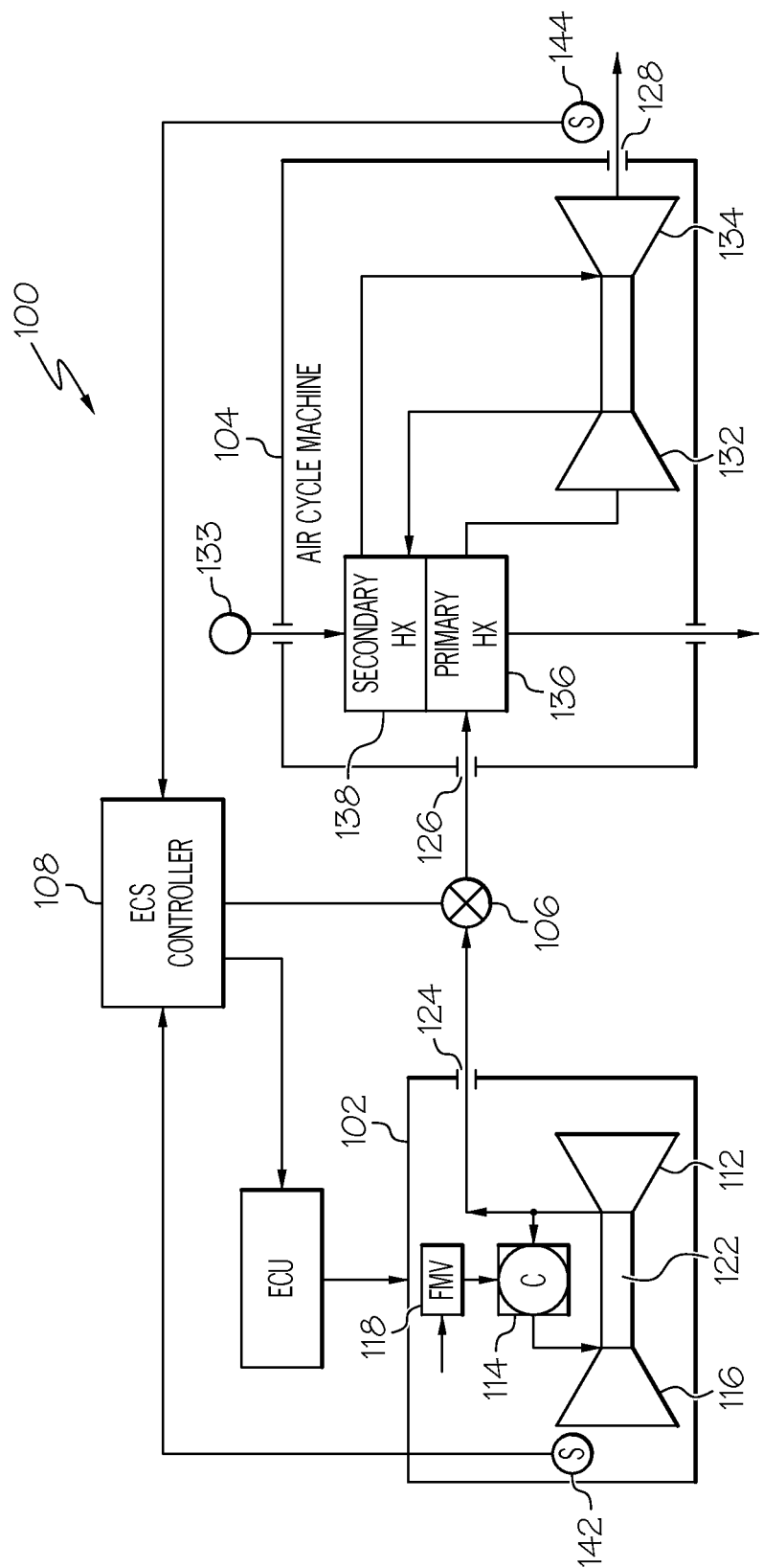
FIG. 1 depicts a schematic representation of a portion of one embodiment of an aircraft environmental control system.

Referring to FIG. 1, a schematic representation of a portion of one embodiment of an aircraft environmental control system (ECS) 100 is depicted. The system 100 includes a gas turbine engine 102, an air cycle machine 104, an inlet flow control valve 106, and an ECS controller 108. In the depicted embodiment, the gas turbine engine 102 is configured as an auxiliary power unit (APU). It will be appreciated, however, that the gas turbine engine 102 could be configured as a propulsion engine or any one of numerous other gas turbine engine configurations.

The depicted APU includes a compressor 112, a combustor 114, and a turbine 116. During operation of the APU 102, the compressor 112 draws in ambient air, compresses it, and discharges a portion of the compressed air into the combustor 114. In the depicted embodiment, only a single compressor 112 is shown, though it will be appreciated that one or more additional compressors could be used. In the combustor 114, the compressed air supplied from the compressor 112 is mixed with fuel that is controllably supplied from a non-illustrated fuel source via, for example, a fuel metering valve 118. The fuel/air mixture is combusted, via non-illustrated igniters, to generate high energy combusted gas that is then directed into the turbine 116. The turbine 116 may include one or more turbines. In the depicted embodiment, only a single turbine is included. No matter the particular number, the combusted gas from the combustor 114 expands through the turbine 116, causing it to rotate. As the turbine 112 rotates, it drives the compressor 12 via a spool 122.

As FIG. 1 also depicts, the APU 102 additionally includes a bleed air outlet port 124. As is generally known, a portion of the compressed air that is discharged from the compressor 112 is directed into and through the bleed air outlet port 124. This compressed air that flows through the bleed air outlet port 124 is generally referred to as bleed air, and is supplied to one or more pneumatic loads. In the depicted embodiment, only a single pneumatic load is depicted. It will be appreciated, however, that the APU 102 may supply bleed air to additional pneumatic loads. Nonetheless, the single pneumatic load that is depicted in FIG. 1 is the air cycle machine 104.

The air cycle machine 104 includes a bleed air inlet 126 and a conditioned air outlet 128. The bleed air inlet 126 is coupled to selectively receive bleed air from the APU bleed air outlet port 124. The air cycle machine 104 is configured, upon receipt of the bleed air, to discharge conditioned air from the conditioned air outlet 128 at a temperature that is significantly lower than the temperature of the bleed air. It will be appreciated that the air cycle machine 104 may be variously configured to implement its functionality. For completeness, one particular, yet non-limiting, configuration will be described.

The depicted air cycle machine 104 includes a compressor 132, a turbine 134, and a plurality of heat exchangers—a primary heat exchanger 136 and a secondary heat exchanger 138. It will be appreciated that in some embodiments, the air cycle machine may be implemented without one or both of the heat exchangers. The compressor 132 selectively receives the bleed air supplied to the bleed air inlet 126. More specifically, the compressor 132 selectively receives a controlled flow of bleed air via the primary heat exchanger 136 and, as will be described further below, the inlet flow control valve 106. The bleed air supplied to the bleed air inlet 126 selectively flows through the primary heat exchanger 136, and into the compressor 132. Cooling air from a cooling air source 133 (e.g., ram air) also flows through the primary heat exchanger 136, removing heat from the bleed air before it enters the compressor 132.

The compressor 132 compresses the cooled bleed air and discharges it into the secondary heat exchanger 138. As the compressed cooled air flows through the secondary heat exchanger 138, it is further cooled by the cooling air and supplied to the turbine 134. This further cooled compressed air flows into and expands through the turbine 134. As a result, even more heat is extracted from the compressed air. Thus, the temperature of the air discharged from the turbine 134 is significantly lower than the temperature of the bleed air. The air discharged from the turbine 134 is the conditioned air that is supplied to and discharged from the conditioned air outlet 128.

The inlet flow control valve 106 coupled between the APU bleed air outlet port 124 and the air cycle machine bleed air inlet 126. The inlet flow control valve 106 thus receives the bleed air discharged from the APU, and selectively supplies a controlled flow of bleed air to the air cycle machine 104. To implement this functionality, the inlet flow control valve 106 is coupled to receive valve commands from the ECS controller 108 and is configured, in response to the valve commands, to move between a closed position and a plurality of open positions, to thereby control the flow of bleed air from the APU 102 to the air cycle machine 104. The inlet flow control valve 106 may be configured as an electrically-controlled, an electromechanically-controlled, a pneumatically-controlled, or a hydraulically-controlled valve.

The ECS controller 108 is configured, among other things, to supply the valve commands to, and thus control the position of, the inlet flow control valve 106. To implement this functionality, the ECS controller 108 receives signals from various sensors and, in response to these signals, supplies appropriate valve commands to the inlet flow control valve 106 to thereby control the flow of bleed air into the bleed air inlet 126. Included among the signals supplied to the controller 108 are an exhaust gas temperature (EGT) signal, which is supplied from an EGT sensor 142, and a conditioned air temperature signal, which is supplied from a conditioned air temperature sensor 144. The EGT sensor 142 is configured to sense the EGT of the APU 102, and supply the EGT signal to the ECS controller 108. The conditioned air temperature sensor 144 is configured to sense the temperature of the conditioned air that is discharged from the conditioned air outlet 128 and supply the conditioned air temperature signal to the ECS controller 108.

Figure 2:
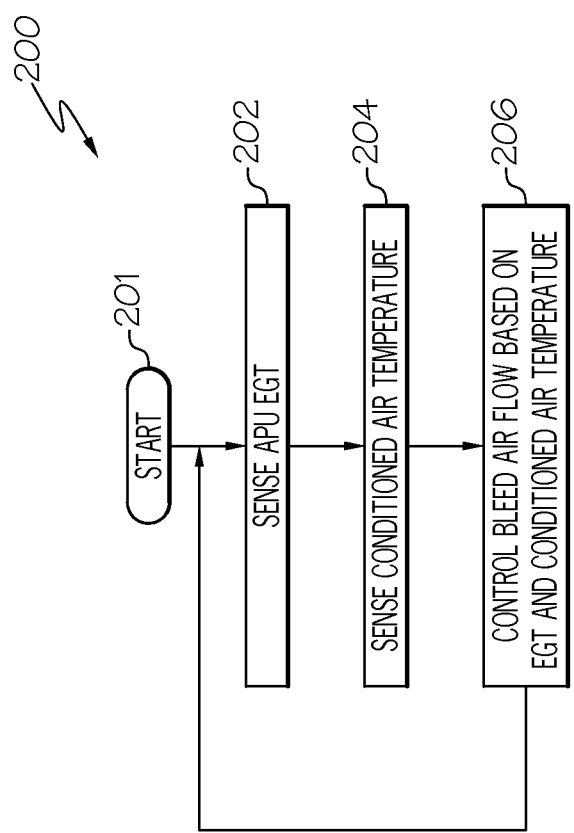
FIG. 2 depicts a control method, in flowchart form, that may be implemented by the exemplary aircraft environmental control system depicted in FIG. 1.

The control methodology that the ECS 100 implements, and that was generally described above, is depicted in flowchart form in FIG. 2, and will be briefly described. The method 200 includes sensing the EGT of the APU (202) and the conditioned air temperature at the conditioned air outlet (204). Based on the sensed EGT and the sensed conditioned air temperature, bleed air flow into the air cycle machine 104 is controlled (206). Controlling bleed air flow into the air cycle machine 104 in this manner, allows the ECS 100 to actively monitor and react to the available power capacity of the APU 102. This control method eliminates (or at least significantly reduces) the need to maintain large thermodynamic performance margins in the ECS 100, and enables the full capability of the APU 102 to be utilized, and thereby improve the overall cooling performance of the ECS 100. By eliminating the need for large thermodynamic margins, the hot day cooling performance for a given size APU 102 can be improved, or comparable cooling performance can be obtained from a smaller, more lightweight APU 102 than is currently used.

Though not previously mentioned, it is noted that the overall operation of the APU 102 is controlled, at least in the depicted embodiment, via an engine control unit (ECU) 146. The ECU 146 is coupled to receive, among other things, various signals from a plurality of non-illustrated sensors, and the EGT signal from the EGT sensor 142. In some embodiments, and as FIG. 1 further depicts, the ECU 146 may also be coupled to receive a signal from the ECS controller 108. In such embodiments, the ECS controller 108 is configured, in response to at least the EGT signal, to supply APU speed commands to the ECU 146. The ECU 146, in response to the speed commands, will control the rotational speed of the APU 102 to the commanded speed. This will allow the APU 102 to run at relatively higher shaft speeds, and thus supply bleed air at relatively higher pressures and flows.

The system and method disclosed herein control bleed air inlet flow into an aircraft ECS system without relying on relatively large margins. As a result, ECS demand and APU capacity can be more closely matched. This eliminates (or at least significantly reduces) the need to maintain large thermodynamic performance margins in the ECS, and enables the full capability of the APU to be utilized, and thereby improves the overall cooling performance of the ECS.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft environmental control system, comprising:
    an air cycle machine having a bleed air inlet and a conditioned air outlet, the air cycle machine adapted to selectively receive a flow of bleed air at the bleed air inlet and configured, upon receipt thereof, to discharge conditioned air from the conditioned air outlet, the conditioned air having a temperature lower than the bleed air;
    an inlet flow control valve coupled to the bleed air inlet and adapted to receive bleed air discharged from a gas turbine engine, the inlet flow control valve coupled to receive valve commands and configured, in response to the valve commands, to move between a closed position and a plurality of open positions;
    an exhaust gas temperature (EGT) sensor configured to sense EGT of the gas turbine engine and supply an EGT signal representative thereof;
    a conditioned air temperature sensor configured to sense the temperature of the conditioned air and supply a conditioned air temperature signal representative thereof; and
    a controller coupled to receive the EGT signal and the conditioned air temperature signal and, based on the EGT and conditioned air temperature signals, configured to supply valve commands to the inlet flow control valve to thereby control the flow of bleed air into the bleed air inlet.

2. The system of claim 1, wherein the air cycle machine comprises:

a compressor coupled to receive the flow of bleed air supplied to the bleed air inlet, the compressor configured to compress the bleed air and discharge the compressed bleed air; and a turbine coupled to receive the compressed bleed air and supply the conditioned air to the conditioned air outlet.

3. The system of claim 2, wherein the air cycle machine further comprises:

a primary heat exchanger coupled to receive the flow of bleed air supplied to the bleed air inlet and a flow of cooling air from a cooling air source, the primary heat exchanger configured to transfer heat from the bleed air to the cooling air and supplied cooled bleed air to the compressor.

4. The system of claim 3, wherein the air cycle machine further comprises:

a secondary heat exchanger coupled to receive the compressed bleed air discharged from the compressor and the flow of cooling air from the cooling air source, the secondary heat exchanger configured to transfer heat from the compressed bleed air to the cooling air and supply cooled compressed air to the turbine.

5. The system of claim 1, wherein the controller is further configured, in response to the EGT signal and the conditioned air temperature signal, to supply gas turbine engine speed commands representative of commanded rotational speeds.

6. The system of claim 5, further comprising:

a gas turbine engine configured to rotate at a rotational speed and supply the flow of bleed air to the air cycle machine; and an engine control unit in operable communication with the gas turbine engine and coupled to receive the gas turbine engine speed commands from the controller, the engine control unit configured, in response to the gas turbine engine speed commands, to control the gas turbine engine to rotate at the commanded rotational speed.

7. The system of claim 1, wherein the gas turbine engine is configured as an auxiliary power unit (APU).

8. An aircraft environmental control system, comprising:

an auxiliary power unit (APU) having a bleed air outlet, the APU configured to selectively discharge bleed air from the bleed air outlet;

an air cycle machine having a bleed air inlet and a conditioned air outlet, the bleed air inlet coupled to selectively receive the bleed air discharged from the APU, the air cycle machine configured, upon receipt of the bleed air, to discharge conditioned air from the conditioned air outlet, the conditioned air having a temperature lower than the bleed air;

an inlet flow control valve coupled between the bleed air outlet and the bleed air inlet to receive the bleed air discharged from the APU, the inlet flow control valve coupled to receive valve commands and configured, in response to the valve commands, to move between a closed position and a plurality of open positions;

an exhaust gas temperature (EGT) sensor configured to sense EGT of the APU and supply an EGT signal representative thereof;

a conditioned air temperature sensor configured to sense the temperature of the conditioned air and supply a conditioned air temperature signal representative thereof; and a controller coupled to receive the EGT signal and the conditioned air temperature signal and, based on the EGT and conditioned air temperature signals, configured to supply valve commands to the inlet flow control valve to thereby control the flow of bleed air into the bleed air inlet.

9. The system of claim 8, wherein the air cycle machine comprises:

a compressor coupled to receive the flow of bleed air supplied to the bleed air inlet, the compressor configured to compress the bleed air and discharge the compressed bleed air; and a turbine coupled to receive the compressed bleed air and supply the conditioned air to the conditioned air outlet.

10. The system of claim 9, wherein the air cycle machine further comprises:

a primary heat exchanger coupled to receive the flow of bleed air supplied to the bleed air inlet and a flow of cooling air from a cooling air source, the primary heat exchanger configured to transfer heat from the bleed air to the cooling air and supplied cooled bleed air to the compressor.

11. The system of claim 10, wherein the air cycle machine further comprises:

a secondary heat exchanger coupled to receive the compressed bleed air discharged from the compressor and the flow of cooling air from the cooling air source, the secondary heat exchanger configured to transfer heat from the compressed bleed air to the cooling air and supply cooled compressed air to the turbine.

12. The system of claim 8, wherein the controller is further configured, in response to the EGT signal and the conditioned air temperature signal, to supply APU speed commands representative of commanded rotational speeds.

13. The system of claim 12, further comprising:

an engine control unit in operable communication with the APU and coupled to receive the APU speed commands from the controller, the engine control unit configured, in response to the APU speed commands, to control the APU to rotate at the commanded rotational speed.

* * * * *